Feb. 20, 1945.  F. P. MEAGHER  2,369,972
COOKING AND HEATING APPARATUS
Filed July 2, 1942  3 Sheets-Sheet 1
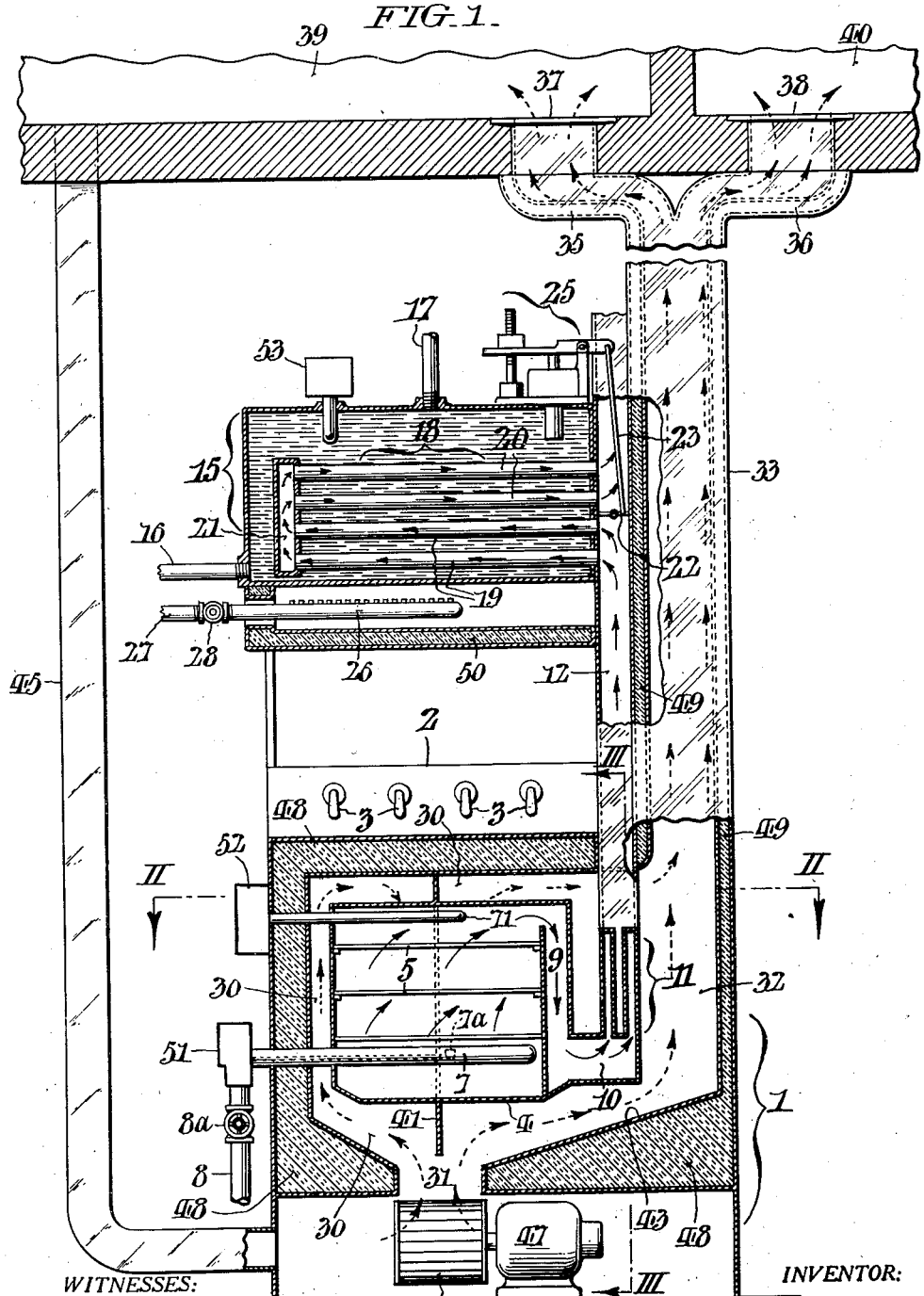

Feb. 20, 1945.   F. P. MEAGHER   2,369,972
COOKING AND HEATING APPARATUS
Filed July 2, 1942   3 Sheets-Sheet 2
FIG-2-
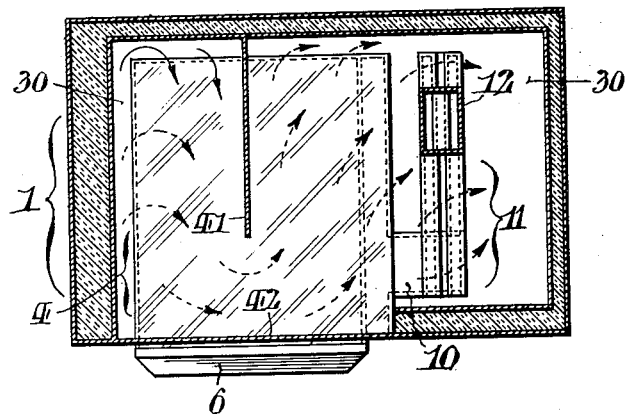
FIG-3-
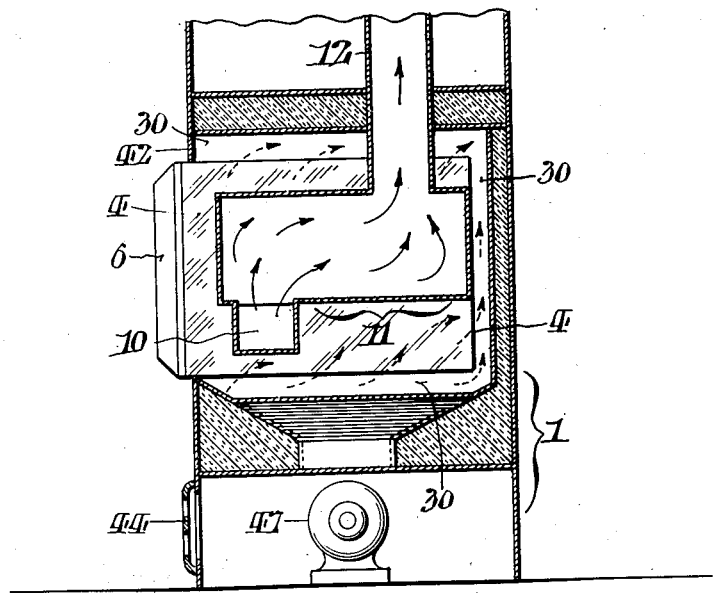
WITNESSES:
John C. Bergner
Thomas W. Kerr, Jr.
INVENTOR:
Fred P. Meagher,
BY Paul & Paul
ATTORNEYS.

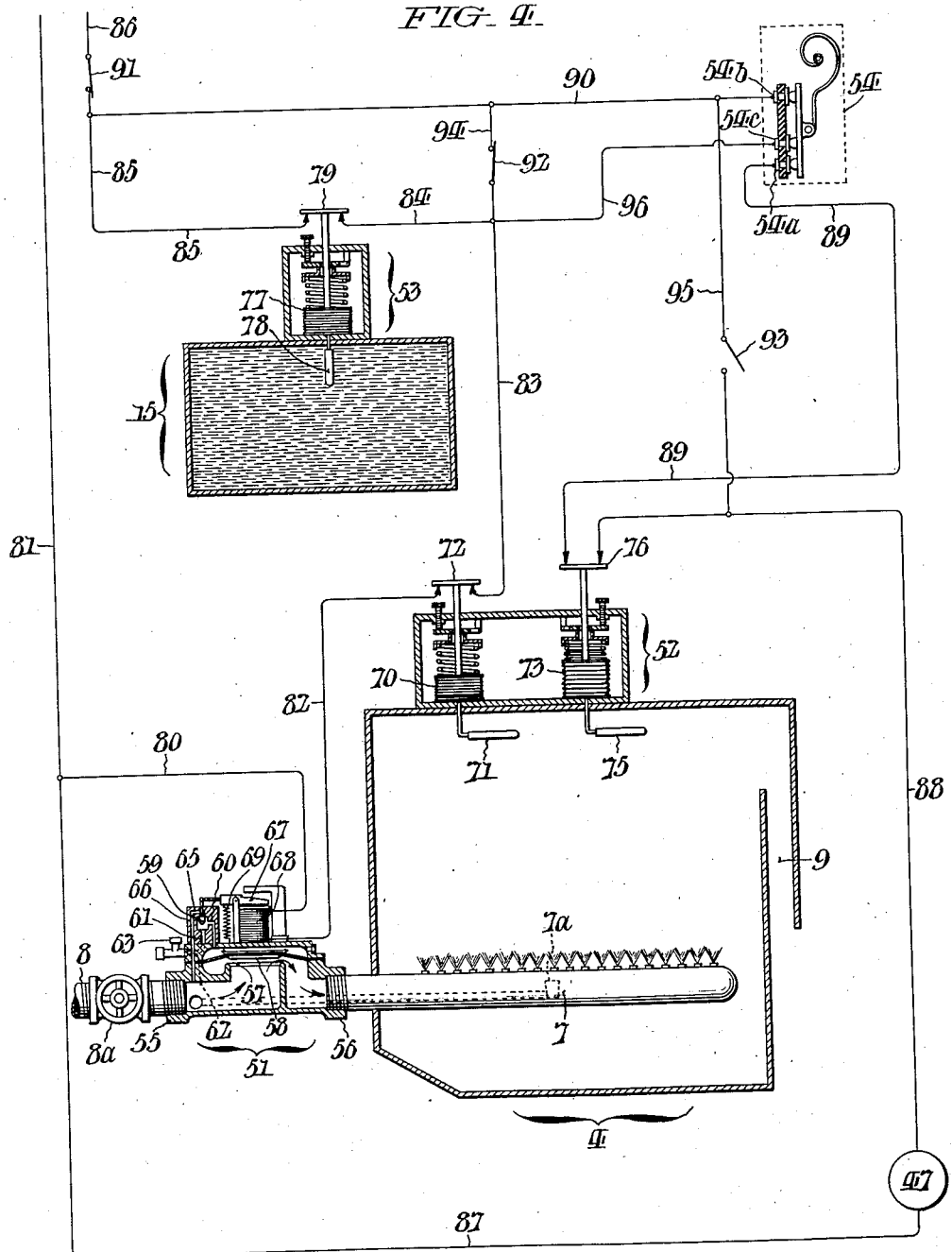

Patented Feb. 20, 1945

2,369,972

UNITED STATES PATENT OFFICE 2,369,972

COOKING AND HEATING APPARATUS

Fred P. Meagher, Media, Pa.

Application July 2, 1942, Serial No. 449,385

9 Claims. (Cl. 237—2)

This invention relates to cooking and heating apparatus, that is to say to apparatus suitable for cooking and also for heating.

The chief aim of my invention is to combine in a unitary apparatus suitable for small houses, cottages, bungalows and apartments, the functions of a cooking stove and a heater for supplying warmth to one or more rooms in addition to the room or kitchen in which the apparatus is situated.

The above objective is realized in practice as hereinafter more fully disclosed, in a relatively small, compact and inexpensive structure having a section or table with suitable burners for ordinary cooking; an oven which is surrounded by an air-flow jacket in communication with a trunk or duct that leads to the room or rooms to be heated; and regulatable automatic controls organized with capacity for maintaining a definite predeterminable room temperature under forced air circulation notwithstanding concurrent baking in the oven at different temperatures.

A further aim of my invention is to make possible the incorporation in a unitary structure having the foregoing attributes of a storage tank in which water is heated for domestic use by hot combustion gases entering the flue after having heated the air passing through the jacket surrounding the oven, and also to provide for automatically controlling the extent of diversion of the hot gases from the flue for automatic maintenance of a predetermined water temperature.

My invention is further concerned with provisions whereby such apparatus can be made to function solely as a means for circulating air in hot weather at times when the oven is not heated or being used for baking.

One of the outstanding advantages of my invention is that it dispenses with three separate devices ordinarily deemed necessary heretofore to habitable living quarters, to wit, a cooking stove, a heater and a hot water unit, with consequent substantial saving of structural materials which at the present time are scarce and requisitioned for war purposes.

Other objects and attendant advantages will appear from the following detailed description of the attached drawings, wherein Fig. 1 is a diagrammatic representation partly in front elevation and partly in vertical section of a combined cooking and heating apparatus conveniently embodying the present improvements.

Fig. 2 is a horizontal section taken as indicated by the angled arrows II—II in Fig. 1.

Fig. 3 is a fragmentary vertical sectional view taken as indicated by the angled arrows III—III in Fig. 1; and Fig. 4 is a hook-up diagram of the various instrumentalities relied upon to automatically control the apparatus under different conditions of operation.

As herein delineated, the combined cooking and heating apparatus of my invention has a casing 1 which may be of sheet metal with an upper or table section 2 for ordinary cooking whereof the gas burners (not shown) are operable by valve handles 3. Below the table 2, the casing 1 affords an oven 4 which is of rectangular configuration and provided with shelves 5, access to the oven being had from the front of the apparatus upon opening the door shown at 6 in Figs. 2 and 3. The oven 4 is heated by means of a burner 7 which is supplied with gas through a pipe 8 having a hand valve 8a interposed therein and the products of combustion, after rising within the oven, pass downwardly through a duct 9 at one side of the oven and into a short lateral conduit 10. From this conduit the hot gases next pass into a radiator-like structure 11, and finally enter the up-right flue shown at 12. Suitably supported at an elevation above the cooking table 2 is a storage tank 15 containing hot water for domestic use, the supply pipe for the tank being shown at 16 and the draw-off pipe at 17. In accordance with my invention, the water in the tank 15 is ordinarily heated by the hot gases which pass up through the flue 12. Accordingly there is built into the tank 15 a radiator 18 which comprises two superposed groups of horizontally arranged tubes 19 and 20, said tubes opening at one end into the flue and at the other end into a header 21. Normally the flow of the hot gases through the unit is as indicated by the solid arrows, that is to say, leftward in the lower tubes 19 and rightward in the upper tubes 20, the volume of the hot gases by-passed through the radiator 18 being regulated by a damper 22 located within the flue. As shown, the damper 22 is automatically operated, through the medium of a connecting link 23, by a thermostatic control device generally designated by the numeral 25 which may be of any approved and well known type. At 26 I have shown an auxiliary burner beneath the tank 15, for use during the summer months or at such times when the oven 4 is not in operation, said burner being supplied with gas through a pipe 27 under manual control of a hand valve 28. Extending around the top, the bottom, the sides and the back of the oven 4 is a jacket 30 which has an air inlet 31 at the bottom and which communicates laterally at 32 with a vertical duct or trunk 33. At the top the trunk 33 is branched as at 35 and 36 for connection with registers 37 and 38 in the floors of two communicating rooms 39 and 40 in the illustrated instance, of an upper story above the room or kitchen in which the apparatus is located. Disposed medially within the jacket 30 is a vertical baffle plate 41 which terminates short of the front wall 42 and the bottom wall 43 of said jacket and thus defines a divided devious course for the air entering through the inlet 31 as shown by the dotted line arrows in Figs. 1-3. As a consequence of having to follow such a tortuous course and due to the disposal of the radiator structure 11 within the lateral part 32 of the jacket 30, the incoming air is effectively heated before it passes up through the trunk 33 and into the rooms 39 and 40. From Fig. 3 it will be noted that a certain amount of air is constantly admitted into the bottom of the casing 1 of the apparatus through a louver door 44, and from Fig. 1, that a duct 45 returns the circulating air from the rooms 39 and 40 to said casing. In order to render the air flow more positive I have provided a squirrel-cage blower whereof the rotor 46 is disposed at the inlet 31 and arranged to be driven by an electric motor 47. For the purpose of maximum heat conservation, the walls of the jacket 30 and the trunk 33 are protected by relatively heavy thermo-insulation as conventionally indicated at 48 and 49. For like reasons the auxiliary burner 26 for heating the water in the boiler 15 is disposed in an underlying space whereof the walls are heavily insulated as instanced at 50 in Fig. 1. If desired, or found advantageous in practice, the exposed surfaces of the water tank 15 may also be similarly covered with insulation.

The equipment relied upon for automatically controlling the apparatus includes an automatic gas control device 51 for the oven burner 7; an oven and blower control device 52; a water tank safety control device 53; and a thermostat 54 (Fig. 4). As diagrammatically shown in Fig. 4, the gas control device 51 has between its inlet and outlet ends 55 and 56 a valve seat 57 with which a diaphragm-supported closure member 58 cooperates. The closure member 58 remains open as long as a small auxiliary valve shown at 59 is in the raised position illustrated to allow pressure relief from the space above the diaphragm by way of a duct 60, a port 61 and a connecting duct 62 to an outlet 63 which leads to an escapement burner (not shown). However, when the auxiliary valve 59 is lowered to close the port 61 and open a port 65 between the duct 60 and a by-pass duct 66 leading from the supply side 55 of the device, the pressure above the diaphragm increases to that of the line pressure so that the closure member 58 eventually drops of its own weight to closed position against the seat 57. The small auxiliary valve 59 is coupled with the pivoted armature 67 of an electromagnet 68; a spring 69 influential upon said armature causing the auxiliary valve to be moved to its lowered position when the electro-magnet is de-energized. As shown, the pilot 7a for the oven burner receives gas from the pressure side of the automatic valve 51.

Included in the oven temperature and fan control device 52 is a thermostatic bellows 70 which is in communication with a temperature sensitive bulb 71 within the oven 4, and which when the oven temperature rises to a degree determined through regulation by means shown for that purpose serves to open an electric switch 72. Another thermostatic bellows 73 embodied in the device 52 is in communication with another temperature sensitive bulb 75 within the oven 4, and when the temperature in the oven drops to a low limit predetermined by pre-setting, serves to open a switch 76.

The water tank safety control device 53 likewise comprises a thermostatic bellows 77 whereof the bulb 78 is exposed to the water in the tank 15 so that when the temperature of the water rises above a predetermined point, the switch shown at 79 is automatically opened.

It is to be understood that the several control devices just described do not, per se, form any part of my invention since they are all of well known construction and available in the open market. However, what I do consider new is the arrangement and interconnection of said devices to govern the operation of the apparatus under different conditions as about to be explained. As shown in Fig. 4, one terminal of the magnet 68 of the gas control 51 is connected through a conductor 80 with one side 81 of a power line, the other end of said coil being connected by a conductor 82 to one contact of the switch 72 of the device 52. The other contact point of the switch 72 is connected through conductors 83 and 84 to one contact of the tank safety control device 53, the other switch contact of said device being connected by a conductor 85 to the other side 86 of the power line. One brush of the fan motor 47 is directly connected, through a conductor 87, to the side 81 of the power line, while the other brush is connected, by a conductor 88, with one contact of the switch 76 of the device 52. The other contact of the switch 76 is connected through a conductor 89 to one terminal 54a of the room thermostat 54, and another terminal 54b of the latter connected by a conductor 90, to the side 86 of the power line. Thus in the diagram the oven and tank control switches 72, 79 are in series with the magnet 68 of the automatic gas valve 51, and the room thermostat 54 in series with the fan control switch 76, with the two groups connected in parallel across the power line 81, 86. Current supply to the system as a whole can be interrupted when necessary by opening a main switch 91 interposed in the side 86 of the power line. The hand switches 92 and 93 in the shunt conductors 94 and 95 are for a purpose later on set forth, there being also a branch conductor 96 which leads from a third contact 54c of the thermostat 54 to the junction between conductors 83 and 84.

In Fig. 4, I have shown the various switches in the positions which they occupy when the oven 4 is being used for baking and heating concurrently, with the thermostatic devices 70 and 73 of the device 52 set to function say at 360° and 340°, respectively, the gas valve 51 being open and the oven burner 7 in operation, thermostat 54 calling for more heat and the fan 47 running. Under these conditions, with the switch 72 in the device 52 closed with consequent current to the magnet 68 of the automatic gas valve to keep the gas flowing to the burner 7 from the power line 81, 86 through the circuit 90, 92, 83, 72, 82 and 80, while the blower motor is kept running through by current passing through the circuit 90, 54b, 54a, 89, 76, 88 and 87. When the temperature of the rooms 39 and 40 reaches a point corresponding to the setting of the thermostat 54, the latter will function to interrupt current flow to the fan motor 47. At the same time, the water in the tank 15 will be heated as a consequence of the by-passing of the hot gases from the flue 12 through the radiator 18 under governance of the damper 22 which is automatically controlled by the thermostatic device 25. If for any reason the temperature of the water should rise beyond the point for which the safety control device 53 is set, the switch 79 of the latter will be automatically opened without affecting the operation of the other parts of the system due to the shunt formed across said switch by reason of the hand switch 92 being closed. If the oven temperature should fall below the degree for which the thermostatic bellows 73 of the device 52 is set, the switch 76 will be automatically opened and the blower motor thereby stopped to prevent induction of cold air into the rooms 39, 40.

When the oven 4 is not being used for baking, the hand switch 92 is opened, thermostatic bellows 70 of the oven control device 52 set to function at approximately 500° and the thermostatic bellows 73 at 125°. Under these conditions, current flow from the line 81, 86 to the magnet of the gas control valve 51 will be by way of conductor 85, switch 79, conductors 84, 83, switch 72, and conductors 82 and 80, providing the water tank control 53 is in closed position.

However, if the temperature in the water tank 15 is sufficiently high, switch 79 will be automatically opened to interrupt the current through conductors 84, 85. On the other hand, if the thermostat 54 should call for heat at this stage, the gas valve 51 will be held open as a result of current flow from the line 81, 86 through the valve magnet 67 by way of conductor 90, bridged thermostat contacts 54b, 54c, conductors 96, 83, closed switch 72 and conductors 82, 80. At the same time the blower motor 47 will be kept running as a consequence of current flow by way of conductor 90, bridged thermostat contacts 54b, 54a, conductor 89, closed switch 76, and conductors 88, 87.

When the temperature in the oven reaches 500°, the Sylphon 70 will operate through the valve 51 to automatically cut off the gas supply to the oven burner 7, but the blower motor 47 will keep on running until stopped under control of the thermostatic bellows 73, the thermostat 54 being relied upon in the meantime to cause cutting off of the current as before in the event that the room temperature rises above the thermostat setting. In this connection it is also to be noted that by virtue of being in series with the gas control magnet, the switch 79 will cause interruption of the gas flow to the burner 7 when the temperature in tank 15 passes beyond the degree at which the thermostatic bellows 77 of the tank control 53 is set to function.

In hot weather when no heating is desired, the apparatus can be made to operate solely as a means for circulating cool air through the rooms 39 and 40, simply by closing the main gas supply hand valve 8a in the pipe 8, by opening the hand switch 92 and by closing the hand switch 93, with the result that the blower motor is connected directly across the power line 81, 86 by way of the conductor 90, switch 93, and conductors 88, 87, with the thermostat 54, the device 52 and the automatic gas control 51 inoperative. Hot water may be had while the apparatus is set to function as an air circulating means in the foregoing manner by employing the auxiliary gas burner 26.

Thus from the foregoing it will be apparent that I have provided a system capable of automatically controlling the apparatus incident to the performance of three separate and distinct functions, to wit: roasting or baking in the oven, heating of water for domestic use, and heating one or more rooms to a predeterminable temperature.

While I have herein, by way of example, shown a cooking and heating apparatus in which the heating is effected by means of gas, it will be apparent that through suitable modifications within the scope of certain of the appended claims that the apparatus can be arranged to operate just as well with electric or oil burners, or even with coal or coke. It is also to be understood that I do not wish to be limited to the precise details of construction and arrangement herein shown by way of example, since these can likewise be variously modified without departing from the spirit of my invention.

Having thus described my invention, I claim:

1. In cooking and heating apparatus of the character described, a stove unit having a cooking oven with a burner therein and a surrounding air heating jacket with an inlet for cold air and an outlet for heated air; a trunk connected to the outlet of the jacket for conducting heated air to a room or rooms other than the one containing the stove unit; means for inducing air flow through the trunk; and regulatable means for automatically controlling the oven burner and the air propelling means for maintenance of predetermined temperatures in said oven and in said room or rooms.

2. In cooking and heating apparatus of the character described, a stove unit having a cooking oven with a burner therein, a flue leading from the oven, and a surrounding air heating jacket with an inlet for cold air and an outlet for heated air; a trunk connected to the outlet of the jacket for conducting heated air to a room or rooms other than the one containing the stove unit; propelling means for inducing air flow through the trunk; a tank for hot water heated by the hot oven gases incident to their passage through the flue; and regulatable means for automatically controlling the oven burner and the air propelling means for maintenance of predetermined temperatures in said oven, in said room or rooms and in said tank.

3. In cooking and heating apparatus of the character described, a stove unit having a cooking oven with a burner therein, a flue leading from the oven, a surrounding air heating jacket with an inlet for cold air and an outlet for heated air, and an incorporated hot water tank; a trunk connected to the outlet of the jacket for conducting heated air to a room or rooms other than the one containing the stove unit; propelling means for inducing air flow through the tank; heating means associated with the tank through which hot oven gases are diverted from the flue; and regulatable means for automatically controlling the oven burner, the air propelling means, and the extent of diversion of the hot gases from the flue through the heating means aforesaid, for maintenance of predetermined temperatures in said oven, in said room or rooms, and in said tank.

4. A combined cooking and heating apparatus of the character described comprising a cooking stove with a casing which provides a cooking oven having a gas burner; an automatic valve for controlling gas supply to the oven burner; a jacket surrounding the oven within the casing and having an air inlet; an electric motor-driven blower within the casing at the air inlet of the jacket; a trunk leading from the jacket to one or more rooms to be heated; switch means for controlling the supply of current to the blower motor; regulatable thermostatic means for automatically governing the gas valve for the maintenance of a predetermined temperature in the oven; and regulatable thermostatic means for automatically interrupting the supply of electric current to the blower motor when the temperature in the oven falls below a predetermined point.

5. Cooking and heating apparatus of the character described comprising a cooking stove with a casing which provides a cooking oven having a gas burner; a jacket surrounding the oven within the casing and having an air inlet; an electric motor-driven blower within the casing for forcing air into said inlet; a trunk leading from the jacket to one or more rooms to be heated; electrically actuated control means for controlling the oven burner; regulatable switch control means within the oven and sensitive to oven temperature for automatically interrupting current flow to said electrically-actuated means to shut off the oven burner when the temperature in the oven rises above a predetermined point; and separate regulatable switch control means within the oven and also sensitive to oven temperature for automatically interrupting current supply to the blower motor when the oven temperature drops below another predetermined degree.

6. Cooking and heating apparatus according to claim 5, including an electric circuit in which the two regulatable switch control means are connected in parallel across a power line.

7. Cooking and heating apparatus according to claim 5, including a regulatable room thermostat operative to automatically interrupt current flow to the blower motor when the room temperature reaches a predetermined point; an electric circuit in which the two temperature sensitive switch control means are connected in parallel across a power line; in which the room thermostat is connected in series with the second mentioned temperature sensitive control means; manual means whereby the oven burner may be shut off; and a normally open shunting switch which may be closed to cut out the room thermostat thereby to keep the blower fan running for cooling purposes in hot weather when the oven is not used.

8. Cooking and heating apparatus according to claim 5, further incorporating a flue which leads from the oven; a water tank and a heating radiator therefor; valve means in the flue for governing diversion of hot gases from the flue through said radiator; and a regulatable switch means sensitive to the temperature in the tank for automatically interrupting current flow to the oven burner control means when the temperature of the water in the tank rises beyond a predetermined degree.

9. Cooking and heating apparatus according to claim 5, further incorporating a flue which leads from the oven; a water tank and a heating radiator therefor; valve means in the flue for governing diversion of hot gases from the flue through said radiator; a regulatable safety control switch means sensitive to the temperature in the tank for automatically interrupting current flow to the oven burner control means when the temperature of the water in the tank rises beyond a predetermined degree; and a circuit in which the oven burner control switch means and the tank safety control switch means are connected in series across a power line, and in which the blower control switch means is separately connected across said power line.

FRED P. MEAGHER.